United States Patent
Numata et al.

(10) Patent No.: US 7,551,237 B2
(45) Date of Patent: Jun. 23, 2009

(54) TELEVISION RECEIVER HAVING DUAL POWER CIRCUITS

(75) Inventors: Takehiko Numata, Hidaka (JP); Shigero Kamise, Fukaya (JP); Akihiko Ishibashi, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 669 days.

(21) Appl. No.: 11/235,094

(22) Filed: Sep. 27, 2005

(65) Prior Publication Data

US 2006/0066757 A1 Mar. 30, 2006

(30) Foreign Application Priority Data

Sep. 30, 2004 (JP) ............................. 2004-288454

(51) Int. Cl.
H04N 5/63 (2006.01)
H04N 5/44 (2006.01)

(52) U.S. Cl. ..................... 348/730; 348/725; 348/706; 348/632

(58) Field of Classification Search .............. 348/730, 348/725, 738, 632, 705, 706, 372, 729; 455/343.1; 713/300, 323, 324
See application file for complete search history.

(56) References Cited

U.S. PATENT DOCUMENTS

| | | | |
|---|---|---|---|
| 5,036,261 A * | 7/1991 | Testin | 315/411 |
| 6,085,326 A * | 7/2000 | Kim | 713/300 |
| 6,337,719 B1 * | 1/2002 | Cuccia | 348/731 |
| 6,452,644 B1 * | 9/2002 | Shimakawa et al. | 348/730 |
| 6,704,063 B1 * | 3/2004 | Van Der Wulp | 348/734 |
| 2002/0109533 A1 * | 8/2002 | Gregorian et al. | 327/99 |
| 2006/0082690 A1 * | 4/2006 | Englert | 348/731 |

FOREIGN PATENT DOCUMENTS

| | | |
|---|---|---|
| JP | 05-161093 | 6/1993 |
| JP | 242255 | 9/2000 |
| JP | 2002-247478 | 8/2002 |
| JP | 2003-078840 | 3/2003 |

* cited by examiner

Primary Examiner—David L Ometz
Assistant Examiner—Jean W Désir
(74) Attorney, Agent, or Firm—Pillsbury Winthrop Shaw Pittman, LLP

(57) ABSTRACT

When the main power supply is turned off, the power supply of a video display unit is turned off and the audio signal is muted. At the same time, a time counting unit counts time, and before reaching a predetermined time, a display unit is lighted to notify a quick restart period. In the case where the main power supply is turned on during the predetermined time, the power supply of the video display unit is turned on to cancel the audio mute mode. In the case where the main power is not turned on upon lapse of the predetermined time, the power supply of the receiving unit is also turned off.

15 Claims, 5 Drawing Sheets

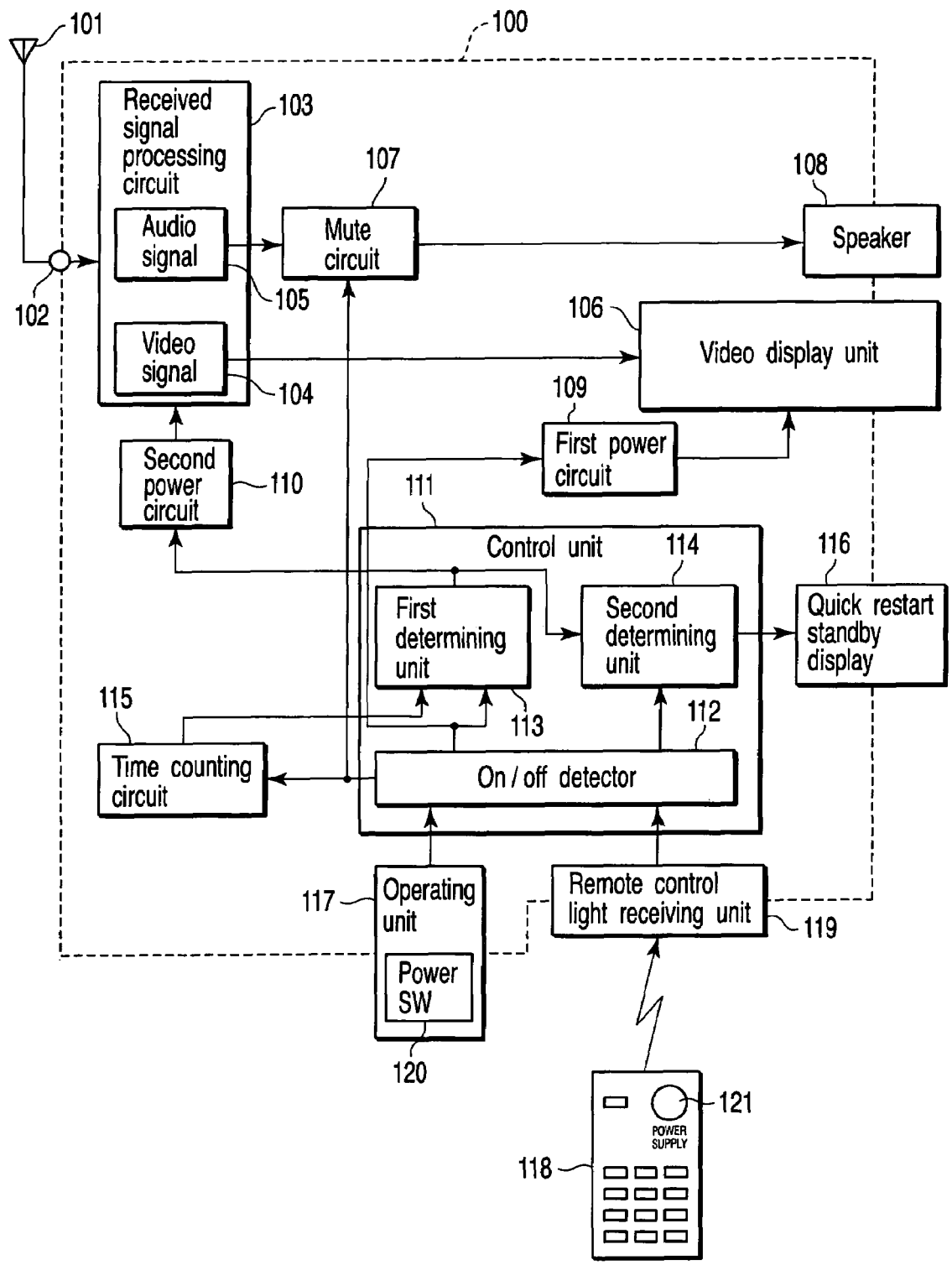
F I G. 1

TELEVISION RECEIVER HAVING DUAL POWER CIRCUITS

CROSS-REFERENCE TO RELATED APPLICATIONS

This application is based upon and claims the benefit of priority from prior Japanese Patent Application No. 2004-288454, filed Sep. 30, 2004, the entire contents of which are incorporated herein by reference.

BACKGROUND OF THE INVENTION

1. Field of the Invention

This invention relates to a television receiver, or in particular to a television receiver capable of functionally switching the operation power supply.

2. Description of the Related Art

As is well known, the digital TV broadcast has started also on the terrestrial wave, and digitization of all types of broadcasts is planned. Along with this trend, the TV receiver to receive the broadcast is required to have a circuit configuration adapted to process the received digital broadcast signals.

The received signal selected by the tuner, for example, is first demodulated and after error correction, descrambled and other processes, separated into packets by a demultiplexer. At the same time, the digital video data and the digital audio data are decoded and converted into non-compressed digital signals. The video signal is converted into an analog signal as required and supplied to a video display, while the audio signal is converted into an analog signal and output through output means such as a speaker.

In the TV receiver compatible with the digital broadcast described above, the signal processing is complicated, and as compared with the signal processing for the analog broadcast, a longer time is required for signal processing. Once the power supply of the receiver is turned off, therefore, not a small amount of time is required before the normal operation of the receiver is restored. In the case where the power supply is turned off erroneously while a program is being viewed, for example, the suspension of viewing the particular program is unavoidable until it becomes viewable again.

Also, with regard to the liquid crystal panel now widely used as a video display, once the power for the control circuit to control the drive operation of the display fails, the power restoration consumes a considerable time and the need of more proper power management is pointed out.

The ordinary TV receiver includes a remote control as standard equipment, which is exclusively used to switch the channel of the receiver, set the volume control and other operations and various adjustments. Even the power can be switched on and off by the remote control.

In the case where the power fails by the erroneous power key operation on the remote control while viewing a program, it takes some time before the image is displayed especially on the digital TV receiver after switching on power again. This causes the user irritation and is never considered convenient for the user.

A similar problem is also posed by the TV receiver having a cathode ray tube as a display with regard to the starting characteristic thereof, on which an improvement effort is under way.

Jpn. Pat. Appln. KOKAI Publication No. 5-161093, for example, discloses a system in which the cathode ray tube is kept cut off for a predetermined time after the timing at which the power is turned off by operating the power key of the remote control, while at the same time muting the sound. Thus, the system is apparently set in the same mode as if power is turned off, and in the case where the power key is operated within a predetermined time, the cutoff state of the cathode ray tube and the voice mute mode are canceled in preparation for immediate resumption of viewing. In the case where the power key fails to be operated for longer than a predetermined time, on the other hand, the normal power turnoff process is executed.

In the proposition disclosed in Jpn. Pat. Appln. KOKAI Publication No. 5-161093, however, the power circuit is controlled so that the video signal is displayed in black during the standby period of a predetermined time. Therefore, power consumption cannot be reduced sizably, and the control operation is simply the activation or the deactivation of the power circuit, thereby making the functional control impossible.

Further, Jpn. Pat. Appln. KOKAI Publication No. 5-161093 assumes that the TV receiver can be activated quickly by turning on the power switch within a predetermined muting time. Nevertheless, the user cannot be informed of the time point to which and how long the starting time can be shortened after turning off power.

Another problem is that the user cannot be informed of the availability of such a function in the TV receiver from the external appearance thereof.

As described above, in the case where the user turns off the power of the conventional TV receiver by error, the proposition so far made to shorten the time before restarting the display after switching on power still fails to obviate the inconvenience of the user.

BRIEF SUMMARY OF THE INVENTION

According to one aspect of the present invention, there is provided a television receiver comprising: a receiving unit configured to receive a television broadcast and output a video signal and an audio signal; a video display unit configured to display an image based on the video signal output from the receiving unit; a mute unit configured to mute the audio signal output from the receiving unit; a power circuit; a power switch command unit configured to issue a command for turning on the power circuit to supply the operating power to the video display unit on one hand and turning off the power circuit to suspend the supply of the operating power to the video display unit on the other hand; a time counting unit; a standby mode display unit; and a control unit configured to switch on/off the power circuit in response to the power switch command from the power switch command unit, detect the command to turn off the power circuit and drive the mute unit to mute the audio signal before the power circuit turns off, cancel the mute mode of the audio signal by detecting the command to turn on the power circuit, detect the command to turn off the power circuit to start the time counting operation of the time counting unit, and display the standby mode on the standby mode display unit before the time count reaches a predetermined time.

According to another aspect of the present invention, there is provided a television receiver comprising: a receiving unit configured to receive a television broadcast and output a video signal and an audio signal; a video display unit configured to display an image based on the video signal output from the receiving unit; an attenuation unit configured to attenuate the video signal output from the receiving unit; a power circuit; a power switch command unit configured to issue a command to turn on the power circuit for supplying the operating power to the video display unit on one hand and to turn off the power circuit for suspending the supply of the operating power to the video display unit on the other hand; a time counting unit; a standby mode display unit; and a control unit configured to switch on/off the power circuit in response to the power switch command from the power switch command unit, detect the command to turn off the power circuit and drive the attenuation unit to attenuate and display the video signal on the video display unit before the power circuit turns off, cancel the attenuation mode of the video signal by detecting the command to turn on the power circuit, detect the command to turn off the power circuit from on state to start the time counting operation on the time counting unit, and display the standby mode on the standby mode display unit before the time count reaches a predetermined time.

BRIEF DESCRIPTION OF THE SEVERAL VIEWS OF THE DRAWING

FIG. 1 is a block diagram for explaining an outline of a TV receiver according to an embodiment of the invention;

DETAILED DESCRIPTION OF THE INVENTION

Figure 2:
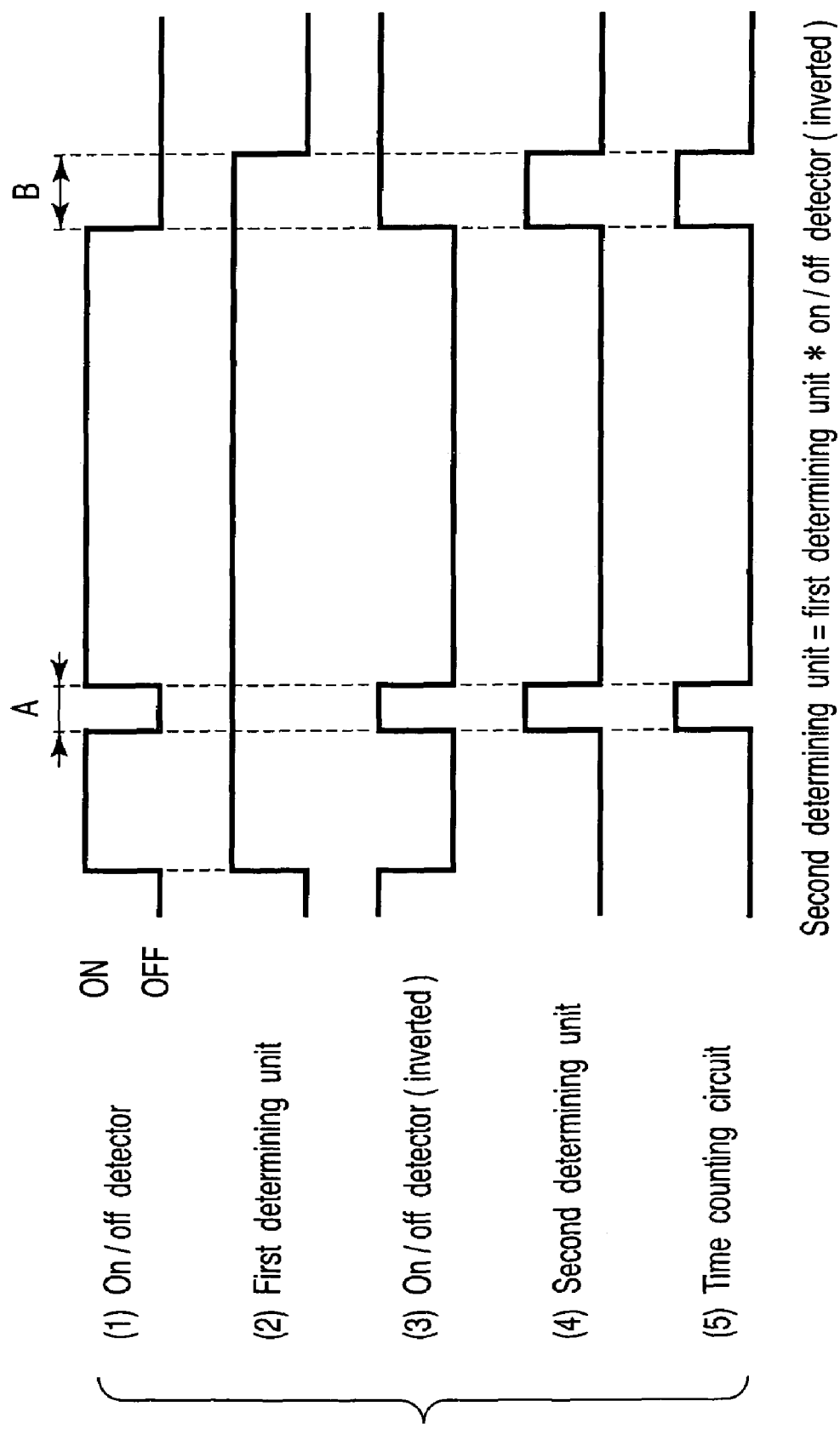
FIG. 2 is a timing chart for explaining the operation of the TV receiver according to the same embodiment.

An embodiment of the invention is described below in detail with reference to the drawings. FIG. 1 shows a general configuration of a TV receiver 100 for explaining this embodiment. The TV receiver 100 includes an antenna input terminal 102 supplied with a broadcast signal from an antenna 101.

The antenna input terminal 102 is connected to a received signal processing circuit 103, so that the broadcast signal input to the antenna input terminal 102 is extracted as a received signal of the desired channel by tuning and then processed as predetermined.

Specifically, in the received signal processing circuit 103, the broadcast signal is first selected by tuning and the received signal of the tuned channel is demodulated and converted into a digital signal. After error correction and other processes, a bit stream is output.

Further, the stream signal is separated and extracted by packet signal to produce a video packet data and an audio packet data. By demodulation of these packet data, a digital video signal and a digital audio signal in uncompressed form are produced.

The received signal processing circuit 103 converts the digital video signal into an analog signal as required, and outputs a digital or analog video signal 104, while at the same time converting the digital audio signal into an analog signal and outputting an audio signal 105.

The video signal 104 output from the received signal processing circuit 103 is supplied to a video display 106 and displayed as an image. Also, the audio signal 105 output from the received signal processing circuit 103 is supplied to a speaker 108 through a mute circuit 107 and output as a voice.

The video display 106 receives the operating power form a first power circuit 109, and the received signal processing circuit 103 receives the operating power from a second power circuit 110. The power circuits 109, 110 are switched on/off by a control unit described later, as explained in detail later.

The TV receiver 100 further includes a control unit 111 for controlling the operation and adjusting the functions of various parts. The control unit 111 is composed of a microcomputer, for example, and executes a plurality of control operations. Only the functions related to the invention are explained below.

Specifically, the control unit 111 executes the functions shown as blocks therein, and includes an on/off detector 112 for detecting whether the power supply is on or off, a first determining unit 113 and a second determining unit 114.

The TV receiver 100 further includes a time counting circuit 115 and a standby display 16 which are connected to the control unit 111.

The time counting circuit 115 counts the time elapsed from the turning off of the power supply and sets the quick restart time. The standby display 116 turns on the quick restart time lamp and informs the user of the quick restart allowance time. The standby display 116 is composed of a LED (light emitting diode), for example.

Further, the TV receiver 100 includes an operating unit 117 having a plurality of operating switches arranged on the front of the receiver housing and a remote control light receiving unit 119 for receiving the signal from the remote control 118. These component parts are connected to the control unit 111.

The operating unit 117 includes a power switch (SW) 120, and by operating this power switch 120, outputs a signal to the control unit 111 to turn on/off the power supply of the receiver 100. The remote control 118 also includes a power key 121. By operating this power key 121, a signal is output to the control unit 111 to turn on/off the power supply of the receiver 100.

The configuration of each circuit is described in more detail. First, the on/off detector 112 in the control unit 111 detects whether the power is on or off using the information such as the signal transmitted to the control unit 111 upon operation of the power switch 120 of the operating unit 117 or the power switch signal transmitted to the control unit 111 from the remote control 118.

Specifically, upon receipt of a signal to turn on the power supply, for example, the on/off detector 112 basically outputs, through the first and second determining units 113, 114, a signal for controlling the first and second power circuits 109, 110. In other words, the power on/off state is detected by controlling the power circuits 109, 110.

The on/off detector 112 outputs an on detection signal assuming the logic value "1" corresponding to the power on state and an off detection signal assuming the logic value "1" corresponding to the power off state with the phase 180° inverted from the on detection signal.

The first determining unit 113 and the second determining unit 114 are each what is called a logic circuit, which outputs various control signals based on the detection output of the on/off detector 112. The first determining unit 113 outputs a signal for controlling the first and second power circuits 109, 110, and has a different output timing for a different circuit. The second determining unit 114 outputs a signal for controlling the light on/off state of the standby display 116.

The time counting circuit 115 is activated in response to the off detection signal from the on/off detector 112 and counts a predetermined time from the particular timing. The output of the time counting circuit 115 includes an off detection signal, for example, which rises to the logic value "1" and after lapse of a predetermined time, falls to "0". This signal is supplied to the first determining unit 113.

The first determining unit 113 is supplied with the on detection signal from the on/off detector 112 and the signal from the time counting circuit 115, and outputs a logic sum thereof. This signal is used to control the turning on/off of the second power circuit 110 on the one hand and supplied to the second determining unit 114 on the other hand.

The second determining unit 114 produces the logic product of the off detection signal from the on/off detector 112 and the output of the first determining unit 113, and supplies the logic product to the standby display 116 thereby to control the light on/off state thereof.

The first power circuit 109 is supplied with the on detection signal as it is from the on/off detector 112, and the mute circuit is supplied with the off detection signal as it is from the on/off detector 112.

Next, the operation of the TV receiver 100 is explained. Assume that the power circuit is on. The operating power is supplied from the first power circuit 109 to the video display 106, and further the operating power is supplied from the second power circuit 110 to the received signal processing circuit 103. The TV receiver 100 is in normal operation mode, and the image of the broadcast signal received is displayed on the video display 106. Also, in the absence of an object of the mute operation by the mute circuit 107, the voice is output from the speaker 108.

Under this condition, assume that the power switch 120 of the operating unit 117 or the power key 121 of the remote control 18 is operated. The control unit 111 detects the operation through the on/off detector 112, so that the on detection signal supplied from the on/off detector 112 to the first power circuit 109 falls and the first power circuit 109 turns off. As a result, the video display 106 turns off and stops video display operation. At the same time, the off detection signal output from the on/off detector 112 switches the mute circuit 107 to the audio mute mode.

Further, the control unit 111 supplies the off detection signal to the time counting circuit 115, which starts the time counting operation at the timing of off detection. Furthermore, the second determining unit 114 outputs a signal to turn on the standby display 116.

Upon measurement by the time counting circuit 115 that a predetermined time has elapsed, the control unit 111 determines it through the first determining unit 113, the output of which turns off the second power circuit 110. At the same time, the standby display 116 is turned off through the second determining unit 114.

Assume that the power switch 120 or the power key 121 of the remote control 118 is operated before the lapse of the predetermined time counted on the time counting circuit 115. The on/off detector 112 detects the fact and outputs an on detection signal. The first power circuit 109 turns on, and the off detection signal falls. The mute circuit 107 stops the mute operation. Further, the output of the second determining unit 114 falls, and therefore the standby display 116 is turned off.

The received signal processing circuit 103 has continued the operation and output the video signal 104 and the audio signal 105 since before the operation of the power switch 120 or the power key 121. By supplying power to the video display 106, therefore, the image is immediately displayed. Also, since the mute mode of the mute circuit 107 is canceled, the voice is output from the speaker 105.

Specifically, the standby display 116 is kept on until the lapse of the predetermined time from the power-off time. The user is thus informed that the quick restart is possible in the case where power is turned on while the standby display 116 is on.

FIG. 2 is a timing chart for explaining the output of each part of the TV receiver 100 shown in FIG. 1. In FIG. 2, (1) indicates an on detection signal of the on/off detector 112, which rises upon operation of the power switch 120 or the power key 121 of the remote control 118 while the power of the receiver 100 is off.

Numeral (2) indicates the output of the first determining unit 113, which is a logic sum of the on detection signal and the output of the time detection circuit 115 shown in FIG. 2(5). Also, (3) shows the off detection signal of the on/off detector 112, which is an inverted logic signal of the on detection signal. Further, (4) indicates the output of the second determining unit 114, which is a logic product of the output of the first determining unit 113 and the off detection signal of (3). Furthermore, (5) indicates the output of the time counting circuit 115 starting to be counted with the rise of the off detection signal and output as a logic value "1" during the counting period.

FIG. 2 shows that the power off operation performed at the start point of the period A is detected, and the power on operation performed again at the ending point of the period A. This period is shorter than the predetermined time counted by the time counting circuit 115. Therefore, the output of the first determining unit 113 remains at logic "1", and the second power circuit 110 is not switched off.

The period B elapsed from the power off operation corresponds to the predetermined time, during which the output of the time counting circuit 115 falls. Thus, the second power circuit 10 turns off. Also, the standby display 116 turns off upon lapse of the period B.

Figure 3:
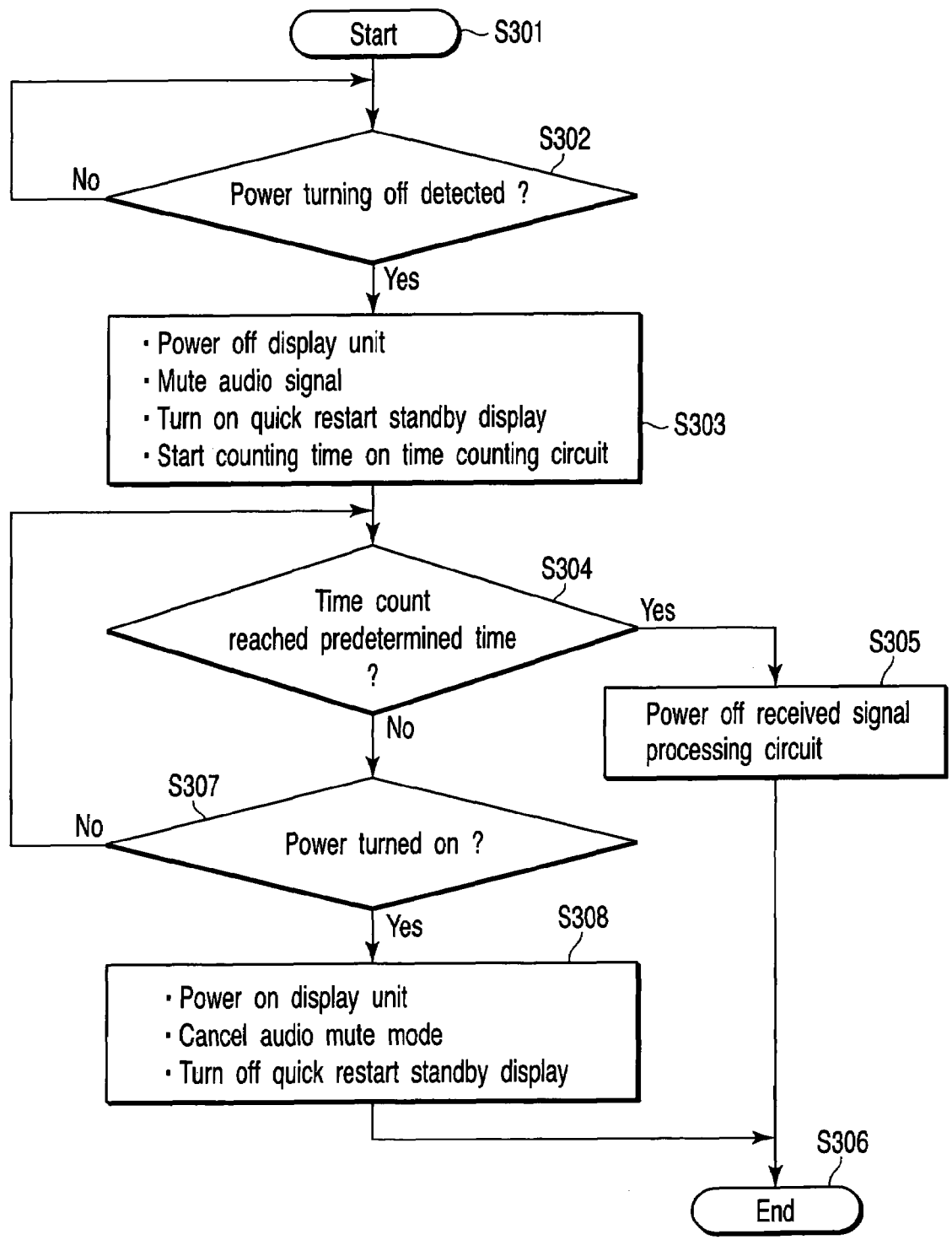
FIG. 3 is a flowchart for explaining the operation of the TV receiver according to the same embodiment.

This process is explained further with reference to the flowchart of FIG. 3. In FIG. 3, the process starts with step S301. At step S302, it is determined whether the turning off of power is detected or not. Upon determination that it is detected, the power of the video display 106 is turned off, the audio mute operation is executed, the standby display is turned on and the time starts being counted in step S303.

Next, in step S304, it is determined whether the time count has reached a predetermined time or not, and upon determination that the predetermined time is reached, the power of the received signal processing circuit 103 is turned off at step S305, and the process is terminated at step S306.

In step S307, on the other hand, it is determined whether the power is turned on before the predetermined time, and in the case where the power is turned on before the predetermined time, the power of the video display 106 is turned on at step S308. The audio mute mode is canceled and the standby display is turned off, followed by ending the process at step S306.

According to this embodiment, when power is turned off, the power of the video display 106 is turned off, and the audio mute operation is carried out. At the same time, the standby display 116 is lighted, thereby informing the user of the quick restart period.

The power circuit is divided into the first power circuit 109 for the video display 106 and the second power circuit 110 for the received signal processing circuit 103, and during the standby period, the received signal processing circuit 103 performs the same operation as in normal mode. In the case where the power is turned on during the standby period, therefore, the video signal and the audio signal output from the received signal processing circuit 103 are immediately restored, thereby alleviating the user irritation.

Figure 4:
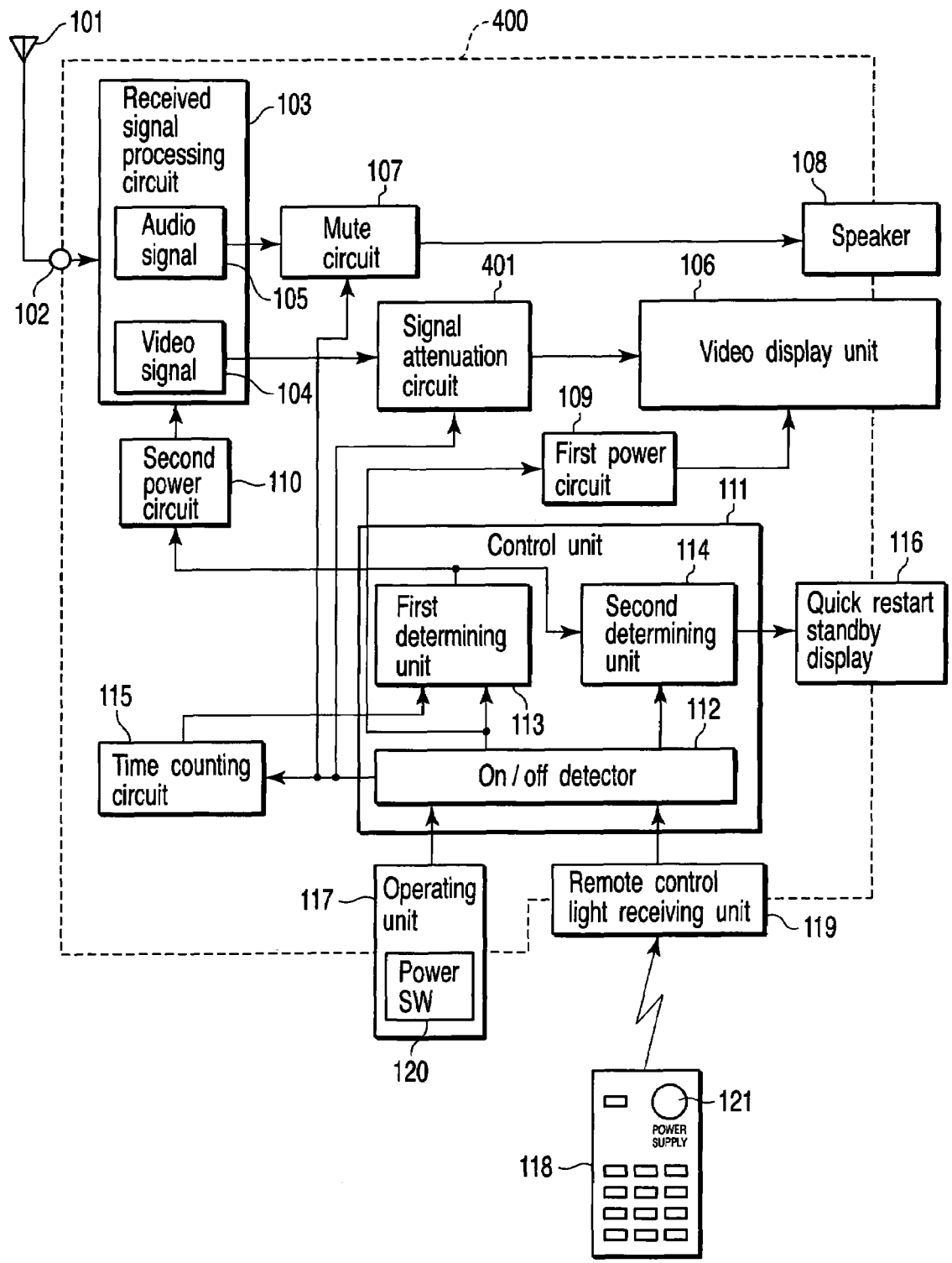
FIG. 4 is a block diagram for explaining an outline of the TV receiver according to another embodiment of the embodiment.

FIG. 4 shows another embodiment of the invention, in which the same circuit component parts as in FIG. 1 are designated by the same reference numerals, respectively.

The TV receiver 400 shown in FIG. 4 includes a signal attenuation circuit 401 arranged in the path for supplying the video signal 104 to the video display 106. The control unit 111 performs the control operation in such a manner that the signal attenuation circuit 401 attenuates the video signal 104 and sends it to the video display 106 during the standby period.

In the case where the liquid crystal panel is used for the video display 106, the back light is turned off normally by turning off the first power circuit 109. In some liquid crystal panels, however, the image is displayed slightly even after the back light is turned off, and therefore the user can more positively recognize the standby period from the slight display.

Figure 5:
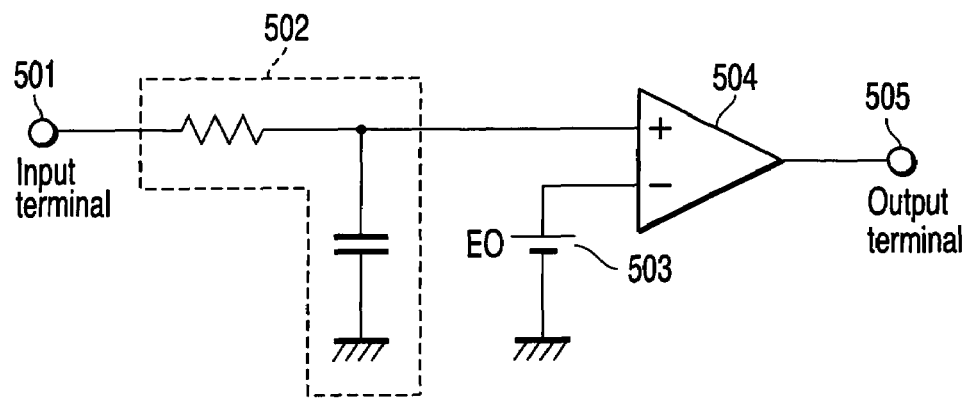
FIG. 5 shows a circuit configuration for explaining a specific example of a time counting circuit used in the TV receiver according to the same embodiment.

FIG. 5 shows a specific example of the time counting circuit 115. The time counting circuit 115 includes an input terminal 501, a CR circuit 502 including a resistor and a capacitor, a comparator 504 for comparing the terminal voltage of the capacitor of the CR circuit 502 with the voltage E0 providing a reference power 503, and an output terminal 505. The input terminal 501 is supplied, for example, with the on detection signal (voltage) shown in FIG. 2(1) from the on/off detector 112.

Upon detection of the off state by the on/off detector 112, the voltage shown in FIG. 2(1) turns to a logic "0", and therefore the charge voltage of the capacitor gradually decreases due to the resistor and the time constant. When the charge voltage drops below the voltage E0 of the reference power supply 503, the output of the comparator 504 is inverted. This inverted output of the comparator 504 is sent from the output terminal 505 to the first determining unit 113, which determines that the predetermined time has passed.

Figure 6:
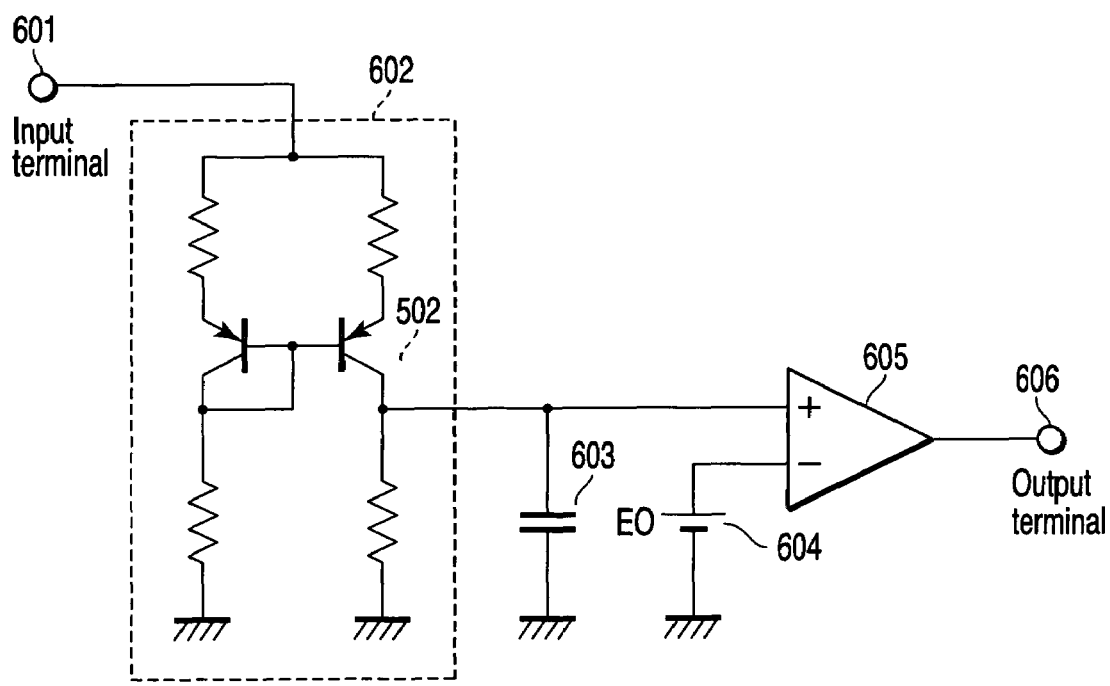
FIG. 6 shows a circuit configuration for explaining another specific example of the time counting circuit used in the TV receiver according to the same embodiment.

FIG. 6 also shows a specific example of the time counting circuit 115 shown in FIG. 4. This circuit is composed of an input terminal 601, a constant current circuit 602, a capacitor 603, a comparator 605 for comparing the terminal voltage of the capacitor 603 with the voltage E0 providing the reference voltage 604, and an output terminal 606.

In the circuit shown in FIG. 6, the input terminal 601 is supplied with the signal (voltage) shown in FIG. 3(1) from the on/off detector 112. Upon detection of an off state by the on/off detector 112, the voltage shown in FIG. 3(1) turns to a logic "0", and therefore the charge voltage of the capacitor 603 gradually decreases through the constant current circuit 602. When the charge voltage drops below the voltage E0 of the reference power supply 604, the output of the comparator 605 is inverted and sent from the output terminal 606 to the first determining unit 113, which determines that the predetermined time is passed.

The time counting circuit 115 may have a built-in counter for counting the clock of a predetermined frequency, and when the count reaches a predetermined value, determines that the predetermined time has passed.

As described above, with the TV receiver according to the invention, the quick restart mode can be positively maintained even in the case where the power supply is turned off by error.

This invention is not limited to the embodiments described above, but can be embodied as various modifications of the component elements without departing from the scope and spirit of the invention. Also, the invention can be variously formed by appropriately combining a plurality of the component elements disclosed in the embodiments described above. Some of the component elements may be deleted from all the components shown in the embodiments. Further, the component elements of different embodiments can be appropriately combined with each other.

What is claimed is:

1. A television receiver comprising:
    a receiving unit configured, to receive a television broadcast and output a video signal and an audio signal;
    a video display unit configured to display an image based on the video signal output from the receiving unit;
    a mute unit configured to mute the audio signal output from the receiving unit;
    a power circuit;
    a power switch command unit configured to issue a command for turning on the power circuit to supply the operating power to the video display unit on one hand and turning off the power circuit to suspend the supply of the operating power to the video display unit on the other hand;
    a time counting unit;
    a standby mode display unit;
    a control unit configured to switch on/off the power circuit in response to the power switch command from the power switch command unit, detect the command to turn off the power circuit and drive the mute unit to mute the audio signal before the power circuit turns off, cancel the mute mode of the audio signal by detecting the command to turn on the power circuit, detect the command to turn off the power circuit to start the time counting operation of the time counting unit, and display the standby mode on the standby mode display unit before the time count reaches a predetermined time;
    wherein the power circuit includes a first power circuit configured to supply the operating power to the video display unit and a second power circuit configured to supply the operating power to the receiving unit, and
    wherein the control unit includes a first determining unit configured to output one logic value during the period when the power switch command unit issues a command to turn on power and during the period before the predetermined time passes from the issue of the command to switch off the power, and output the other logic value for the remaining period, the control unit being configured to output a control signal to turn on the second power circuit during the period when the first determining unit outputs the one logic value, the standby mode display unit being configured to display the standby mode. during the period before lapse of the predetermined time from the issue of the command by the power switch command unit to switch off the power.

2. The television receiver according to claim 1, wherein the control unit includes a second determining unit configured to determine the period during which the first power circuit is turned off, and make the standby mode display unit display the standby mode during the period when the first determining unit outputs the one logic value and when the first power circuit is off as determined by the second determining unit.

3. The television receiver according to claim 1, wherein the power switch command unit is configured to issue a switch command to the power circuit based on the operation of selected one of the power switch of the operating unit arranged on the receiver body or the power key arranged on the remote control.

4. The television receiver according to claim 1, wherein the time counting unit comprises a counter which counts the clock, and is configured to determine that the predetermined time has passed when the count on the counter reaches a predetermined value.

5. The television receiver according to claim 1, wherein the time counting unit includes a capacitor and a comparator which compares a terminal voltage of the capacitor with a reference value, and is configured to detect the timing when the terminal voltage of the capacitor exceeds the reference value as a predetermined time.

6. The television receiver according to claim 1, wherein the time counting unit includes a constant current circuit and a comparator which compares a terminal voltage of the constant current circuit with a reference value, and is configured to detect the timing when the terminal voltage of the constant current circuit exceeds the reference value as a predetermined time.

7. A television receiver comprising:
a receiving unit configured to receive a television broadcast and output a video signal and an audio signal;
a video display unit configured to display an image based on the video signal output from the receiving unit;
an attenuation unit configured to attenuate the video signal output from the receiving unit;
a power circuit;
a power switch command unit configured to issue a command to turn on the power circuit for supplying the operating power to the video display unit on one hand and to turn off the power circuit for suspending the supply of the operating power to the video display unit on the other hand;
a time counting unit;
a standby mode display unit;
a control unit configured to switch on/off the power circuit in response to the power switch command from the power switch command unit, detect the command to turn off the power circuit and drive the attenuation unit to attenuate and display the video signal on the video display unit before the power circuit turns off, cancel the attenuation mode of the video signal by detecting the command to turn on the power circuit, detect the command to turn off the power circuit from on state to start the time counting operation on the time counting unit, and display the standby mode on the standby mode display unit before the time count reaches a predetermined time;
wherein the power circuit includes a first power circuit configured to supply the operating power to the video display unit and a second power circuit configured to supply the operating power to the receiving unit, and
wherein the control unit includes a first determining unit configured to output one logic value during the period when the power switch command unit issues a command to turn on power and during the period before the predetermined time passes from the issue of the command to switch off the power, and output the other logic value during the remaining period, the control unit being configured to output a control signal to turn on the second power circuit during the period when the first determining unit outputs the one logic value, the standby mode display unit being configured to display the standby mode during the period before lapse of the predetermined time from the issue of the command by the power switch command unit to switch off the power.

8. The television receiver according to claim 7,
wherein the attenuation unit is configured to be switched by the control unit between the mode in which the amplitude of the video signal is attenuated below the input amplitude and the mode in which the amplitude of the video signal is not attenuated below the input amplitude.

9. The television receiver according to claim 7,
wherein the attenuation unit is configured to be switched by the control unit between the mode in which the video signal is not supplied to the video display unit and the mode in which the video signal is supplied to the video display unit.

10. The television receiver according to claim 7,
wherein the control unit includes a second determining unit configured to determine the period during which the first power circuit is turned off, and make the standby mode display unit display the standby mode during the period when the first determining unit outputs the one logic value and when the first power circuit is controlled in off state as determined by the second determining unit.

11. The television receiver according to claim 7,
wherein the power switch command unit is configured to issue a switch command to the power circuit based on the operation of selected one of the power switch of the operating unit arranged on the receiver body and the power key arranged on the remote control.

12. The television receiver according to claim 7,
wherein the time counting unit comprises a counter which counts the clock, and is configured to determine that the predetermined time has passed when the count on the counter reaches a predetermined value.

13. The television receiver according to claim 7,
wherein the time counting unit includes a capacitor and a comparator which compares a terminal voltage of the capacitor with a reference value, and is configured to detect the timing when the terminal voltage of the capacitor exceeds the reference value as a predetermined time.

14. The television receiver according to claim 7,
wherein the time counting unit includes a constant current circuit and a comparator which compares a terminal voltage of the constant current circuit with a reference value, and is configured to detect the timing when the terminal voltage of the constant current circuit exceeds the reference value as a predetermined time.

15. A television receiver comprising:
a receiving unit configured to receive a television broadcast and output a video signal and an audio signal;
a video display unit configured to display an image based on the video signal output from the receiving unit;
a mute unit configured to mute the audio signal output from the receiving unit;
a power supply including a first power circuit configured to supply operation power to the video display unit, and a second power circuit configured to supply operation power to the receiving unit;
an operation unit configured to supply the power supply with a command for setting the power supply in an on state for supplying operation power, and a command for setting the power supply in an off state for stopping supply of the operation power; and
a control unit configured to turn off the first power supply circuit to stop supply of the operation power to the video display unit and to cause the mute unit to mute the audio signal when the operation unit supplies the command for setting the power supply in the off state, the control unit being also configured to keep the second power supply circuit in an on state to continue supply of the operation power to the receiving unit, for a time after the operation unit supplies the command for setting the power supply in the off state, and to turn off the second power supply circuit to stop the supply of the operation power to the receiving unit, after the time elapses.

* * * * *